United States Patent Office 3,129,105
Patented Apr. 14, 1964

3,129,105
FIBROUS METAL TITANATES
Kenneth L. Berry and Donald M. Sowards, Wilmington, Del., assignors to E. I. du Pont de Nemours and Company, Wilmington, Del., a corporation of Delaware
No Drawing. Filed July 28, 1961, Ser. No. 127,483
7 Claims. (Cl. 106—55)

This invention relates to new, improved fibrous water-insoluble metal polycationic titanates and to novel methods for their preparation.

Highly useful water-insoluble alkali metal titanates of an asbestos-like fibrous nature and methods for their preparation are described in U.S. Patents No. 2,833,620 and 2,841,470. These products correspond to the general formula $M_2O\cdot(TiO_2)_n$ wherein M is an alkali metal selected from the group consisting of potassium, sodium, rubidium and cesium, and $n$ is an integer having a value ranging from 2 to 7. Such products do not form hydrates, i.e. absorb water of crystallization and are characterized by a fibrous structure in which one dimension of the crystal is longer than the other by a factor of at least 5 and up to 1000 or more. As described in said U.S. Patent 2,833,620, the fibrous alkali metal titanate can be prepared through reaction of an alkali metal compound, such as the carbonate or hydroxide (or other water-soluble compound, e.g., an alkali metal phosphate and which is preferably basic or give a basic reaction with water) with an oxygen-containing titanium compound, such as $TiO_2$ or a soluble salt thereof such as titanyl sulfate or the lower titanates, using a ratio of alkali metal to titanium, calculated as alkali metal oxide to titanium dioxide, of from 1:6 to 12:1. Generally, a ratio of at least 1:1 and preferably between 3:1 and 8:1 is employed in the presence of water at temperatures of at least 400° C. and a pressure of at least 200 atmospheres. More conveniently, these titanates can be synthesized as described in U.S. 2,841,470, by heating a chloride or fluoride of the alkali metals mentioned, or mixtures thereof, to a molten state at temperatures ranging up to 1200° C., and dissolving in this flux a non-fibrous titanate having the formula $M_2O(TiO_2)_{2n}$ wherein $n$ is an integer 2-3 or $TiO_2$ and a source of alkali metal oxide such as $M_2CO_3$ or MOH wherein M is an alkali metal above mentioned, and until the molten halide flux becomes saturated with the titanium compound while fibrous titanates are formed therein. Separation of the fibrous product from the salt flux can be effected by leaching with water at room temperature. When less than 20% fluoride is present in the salt mixture, production of hexatitanate $M_2O(TiO_2)_6$ results, with M in said formula being an alkali metal of atomic number of at least 11, i.e., sodium, potassium, rubidium and cesium.

It has now been discovered that novel fibrous mono- or di-alkali metal polycationic titanates of increased $TiO_2$ content and exhibiting by X-ray diffraction analysis a definite pattern of crystalline structure can be obtained by substituting protons or hydronium ions ($H_3O^+$) for the alkali metal ions present in prior fibrous alkali metal titanate products. It is among the principal objects of this invention therefore to produce such improved protonated fibrous titanates and to provide novel methods for their synthesis. Other objects and advantages of the invention will be apparent from the ensuing description.

In accordance with the invention, our novel protonated fibrous titanates are produced by treating a fibrous alkali metal titanate with various dilute mineral or organic acids in water and then subjecting the resulting product to calcination at temperatures ranging from about 300–700° C. to obtain a product having the general formula

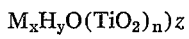

$$M_xH_yO(TiO_2)_n z$$

wherein $x=1$ to 2; $y=1$ to 15, $n$ is an integer of 6 to 7 and $z=\frac{1}{2}(x+y)$, and M is an alkali metal of atomic number of at least 11.

The invention will be described as applied to the treatment and conversion of potassium hexatitanate

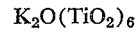

$$K_2O(TiO_2)_6$$

but it will be understood that it applies to fibrous alkali metal titanates generally corresponding to the formula $M_2O(TiO_2)_{6-7}$ wherein M is an alkali metal of atomic number of 11 or greater, i.e., sodium, potassium, rubidium and cesium. Thus, in accordance with the procedures of the patents mentioned above, fibrous potassium hexatitanate can be prepared by reacting titanium dioxide and potassium carbonate in 5:1 molar proportions, respectively, by melting at 1400° C. to obtain a colorless mass of needle-like non-fibrous crytsals on cooling. The material (6.476 parts) can be placed in approximately 100 parts of molten potassium chloride in a vertical, tubular vessel and heated therein to provide a temperature of 1090° C.–1115° C. at the bottom of the vessel and 980° C.–1040° C. at the top of such vessel. Fibrous crystals grow continuously in the top of the melt and are removed intermittently. Potassium chloride addition to the melt can be effected to replace that occluded to the removed fibrous product. This is subsequently removed from the fibers by expressing the major part at 850° C. and evaporating the remainder in an air stream at 1200° C. to leave 3.98 parts of fine fiber product containing on analysis 50.04% titanium, and 12.5% potassium having the formula $K_2Ti_6O_{13}$ and following X-ray diffraction pattern.

| Interplanar spacings (Angstroms) | Relative intensity |
|---|---|
| 8.93 | 10 |
| 7.69 | 100 |
| 6.41 | 69 |
| 4.48 | 8 |
| 3.83 | 4 |
| 3.77 | 4 |
| 3.67 | 18 |
| 3.2 | 7 |
| 3.04 | 47 |
| 2.98 | 60 |
| 2.97 | 66 |
| 2.90 | 7 |
| 2.79 | 23 |
| 2.70 | 28 |
| 2.64 | 7 |
| 2.58 | 23 |
| 2.10 | 32 |
| 2.08 | 32 |
| 1.90 | 26 |

X-ray diffraction patterns reveal that individual fibers of hexatitanates are single crystals with the $b$ axis parallel with the fiber axis. Cell dimensions of potassium and sodium hexatitanate, for example, are as follows:

|  | $a_0$ (A) | $b_0$ (A) | $c_0$ (A) | $\beta$ |
|---|---|---|---|---|
| $K_2 \cdot Ti_6O_{13}$ | 15.60 | 3.80 | 9.13 | 99.6 |
| $Na_2Ti_6O_{13}$ | 15.13 | 3.80 | 9.21 | 99.2 |

Cross-sectional dimensions of fibers prepared by the methods described are similar and range from 0.5 to 5 microns with the average being about 1 micron. Fiber lengths are dependent upon the control of crystal growth, density of the growth and entanglement of fibers, and the severity of mechanical treatment to disperse the crystals. Maximum lengths to about 20 mm. have been observed in samples appropriately prepared and handled, but usually 80 percent of the fibers are less than 2 mm. long after complete dispersion by shear in aqueous suspension.

X-ray crystallographic examination indicates that individual fibers are single crystals with the $b$ axis parallel with the fiber axis and with channels running parallel with the $a$ axis. Channels in the crystal separate sheets of Ti—$O_8$ octahedra which are cross-linked by a $$O-Ti-O$$

bond. The diameter of a channel is therefore thought to be in the range of 4.6 angstroms and is sufficiently large to contain the alkali metal ions which fit within the channels. Sufficiently large cations like the hydronium ion can displace alkali metal ions within the crystal lattice. Apparently, the size of the channels is similar for both the sodium and potassium titanate cases since their cell dimensions vary so little.

The fibrous alkali metal titanate product is then converted to the new fibrous polycationic titanates of this invention in which the $TiO_2$ content is as high as 96% (by weight) with hydrogen or hydronium ions substituted for the alkali metal present by reacting such product in a dilute aqueous mineral or organic acid solution in the liquid state, at temperatures ranging from 25° C. to the critical temperature of water and preferably at temperatures ranging from 80° C. to 100° C. with gentle stirring, and then calcining the resulting product at temperatures ranging from about 300° C. to 700° C. and preferably from 400° C. to 600° C.

As a result of such aqueous dilute acid treatment, cationically substituted alkali metal titanates are formed having the formula $$M_x(H_3O)_y[O(TiO_2)_n]_z$$

wherein $x$ equals 1 to 2; $y$ equals 1 to 15; $z$ equals $\frac{1}{2}(x+y)$; $n$ is 6–7, M is an alkali metal of atomic number of at least 11, and the mole ratio of $TiO_2/M_2O$ is as high as 50 in the fiber. Upon heating or calcining this product as indicated, the lattice water is driven off to leave a protonated fiber having the general formula $$M_xH_y[O(TiO_2)_{6-7}]_z$$

wherein $x$ equals 1 to 2; $y$ equals 1 to 15; $z$ equals $\frac{1}{2}(x+y)$ and M is an alkali metal selected from the group consisting of sodium, potassium, rubidium and cesium.

Dilute acids useful in the invention include mineral acids, such as nitric, sulfuric, hydrochloric, hydrofluoric, phosphoric, and organic acids such as acetic, carbonic, or other compounds adapted to produce the hydronium ion ($H_3O^+$) in solution. Such acids are employed in concentrations with the pH range of from 2–7. The more concentrated the acid solution used, the greater will be the destruction by dissolution effected on the titanate fiber. Thus, the hexatitanate fibers become completely dissolved by concentrated hydrofluoric acid solutions (49%), sulfuric acid and 6 N HCl during several days of boiling.

The degree of replacement of alkali metal ions will be found to be a function of the reaction time, acid concentration and temperature of the solution. In general, higher concentrations, temperatures and exposure times yield a higher degree of substitutions. Exposure time can be decreased with increasing acid concentration and temperatures to obtain a given degree of displacement within the fiber. Equilibration occurs when the rate of displacement of alkali metal ions by hydronium ion is equivalent to the rate of displacement of hydronium ions by alkali metal ions in solution. Removing alkali metal ions from solution with anions on ion exchange resins which form insoluble alkali metal compounds increases the rate of displacement such that exposure times for partial replacement can be decreased to less than an hour. Equilibration studies are conducted by analyzing aliquots of the salt or acid solution for displaced cation by pH measurements or by base titrations. Several procedures can be used for determining alkali metal ion involving spectrometric methods.

Following the acid treatment, the product is filtered free of salt or acid solution, water washed and dried at 100° C. Its physical appearance changes little. Under magnification, however, especially by electron microscopy, some swelling and exfoliation (splitting) along the axis will be found to occur after a high degree of protonation. X-ray powder patterns are different from the unsubstituted alkali metal hexatitanates in every case.

To a clearer understanding of the invention, the following examples are given. These are for purposes of further illustrating procedures for preparing our new fibrous products and are not to be considered as limiting the scope of the invention.

*Example I*

9 grams of potassium hexatitanate fibers prepared as above were suspended in 200 ml. of sulfuric acid at pH 4.5 for a period of 15 hours at 90° C. with occasional stirring using a glass rod. The product was filtered through a sintered glass Buchner funnel, water washed, then dried in an oven at 105° C. for 30 hours.

This product was analyzed by standard methods and was found to contain 7.3% $H_2O$ and had the formula $$-K(H_3O)_7[O(TiO_2)_6]_4$$

After heating to 320° C., about 2% of the water was removed and on heating to 600° C., all the lattice water was removed to leave a white protonated fibrous titanate material similar to the starting product, but changed in chemical analysis. Its composition consisted of 94.5% $TiO_2$, 2.5% $K_2O$, 3% $H_2O$, and it had the formula $$KH_7[O(TiO_2)_6]_4$$

On X-ray analysis, its patterns were found to be the following which were similar to but different from the starting material $K_2Ti_6O_{13}$.

| Interplanar spacings (Angstroms): | Relative intensity |
|---|---|
| 3.798 | Very weak. |
| 3.553 | Moderate. |
| 3.498 | Strong. |
| 3.074 | (M). |
| 2.949 | (M). |
| 2.6930 | (Weak). |
| 2.660 | (W). |
| 2.416 | (W). |
| 2.067 | (W). |
| 2.021 | (M). |
| 1.8754 | (M). |
| 1.5790 | (W). |
| 1.4775 | (W). |

*Example II*

10 grams of potassium hexatitanate fibers were suspended in 200 mls. of $HNO_3$ at a pH of 3.5 for a period of 5 hours at 90° C. with occasional stirring. The product was filtered from solution, water-washed, then dried in an oven at 105° C. overnight. Analysis indicated the product had the formula:

$$K_2(H_3O)_{12}[O(TiO_2)_6]_7$$

Upon being heated to 600° C. for 3 hours, analysis of the fibers revealed that it was a protonated product having the following composition: 2.61% $K_2O$, 94.6% $TiO_2$, and formula $$K_2H_{12}[O(TiO_2)_6]_7$$

*Example III*

10 grams of sodium hexatitanate fibers ($Na_2O(TiO_2)_6$) were placed in 200 mls. of dilute hydrochloric acid at pH 4.5 and heated in a platinum-lined autoclave at 300° C. under autogenous pressure for 20 minutes. The product was then water-washed and dried at 100° C. for 30 hours. The protonated fibrous product was found to contain 96% $TiO_2$ after calcining at 700° C. for 1 hour.

*Example IV*

10 grams of rubidium hexatitanate fibers $$(Rb_2O(TiO_2)_6)$$

were treated with 200 mls. of sulfuric acid at pH 3.1 for 5 hours at 95° C. After water washing and calcining at 400° C. for 58 hours, the protonated fibrous material was found to contain 94.2% $TiO_2$.

*Example V*

10 grams of cesium hexatitanate fibers ($Cs_2O(TiO_2)_6$) were suspended in 200 mls. of dilute phosphoric acid at pH 2.5 at 50° C. for 18 hours. The water-washed and dried protonated fibrous material was found to contain 91% $TiO_2$ after calcining at 600° C. for 5 hours.

It will thus be seen that our invention involves a novel process for treating various fibrous alkali metal titanates with dilute aqueous solutions of acids to displace the alkali metal cations by hydronium ($H_3O^+$) ions which fit into channels within the crystal lattice. Lattice water is then dispelled by calcination treatment, leaving the fibers similar in apparance to the original product but advantageously enriched to provide a $TiO_2$ content as high as 96% by weight. In such state, the product is highly usful as a paper pigment and its usefulness in other applications also becomes considerably enhanced. These new fibrous products are asbestos-like materials, hydrated in the uncalcined state to contain lattice water and when calcined contain water of constitution, and are water insoluble. at temperatures above 1000° C. the fibers decompose and the vapor pressure of alkali and water becomes significant. As a result the material is converted without appreciable change in appearance to rutile, but its flexibility and asbestos-like nature disappears. This conversion occurs at very slow rates at temperatures in the range of 800 to 1000° C. The protonated fibers are dissolved by concentrated acid solutions and in alkali, a reversible cation exchange takes place. Tests of the reversibility of cation exchange in protonated fibers can be made by making a potentiometric titration with dilute alkali. A titration with 0.02 N NaOH showed immediate reversible capacities of only 3–4 milliequivalents/100 grams in the case of $K_2(H_3O)_4[O(TiO_2)_6]_3$ fibers having a specific surface area of 11 m.²/gram as determined by $N_2$ adsorption in accordance with the conventional Brunauer, Emmet and Teller method.

These fibrous products are also improved by their reduction in alkalinity and bulk density. Pads and blocks of the felted fibers are reduced to a bulk density which is as low as 70% of the non-treated fibers in the case of potassium hexatitanate. This 30% reduction in weight without altering thermal insulating properties increases their usefulness in many applications where weight conservation is important. Thus, fibers and fabrics that retain high strength above 2000° F. are adaptable in various space and military uses. Hence, our products can be incorporated into blocks, fabrics, felts or other forms for use as parachutes for slowing down space vehicles, high temperature insulation in space vehicles, high temperature inflatable items and other high temperature applications. Similarly, they are useful in industrial applications, such as protective clothing and laminated structures. The reduction in alkalinity exhibited by protonated potassium hexatitanate fibers, for example, renders them less corrosive to materials of construction with which they are in contact in thermal insulation applications. Additionally, our improved fibers can be blended now with a wider group of polymers and resins which are decomposed in the presence of alkali. Many prior formulations with untreated fibers were unsatisfactory because of this fact. The decreased alkalinity and bulk density which our novel products provide enhances their usefulness as constituents in many compositions such as reinforcing fibers for plastics, paper opacifying pigments, rubber extenders, pigments, etc.

We claim:

1. A fibrous water-insoluble protonated alkali metal hexatitanate of the general formula $M_xH_y(O(TiO_2)_n)_z$ wherein $x$ equals 1 to 2; $y$ equals 1 to 15; $z$ equals $\frac{1}{2}(x+y)$; $n$ is 6–7; and M is an alkali metal of atomic number of at least 11.

2. A fibrous water-insoluble protonated potassium hexatitanate having the formula $K_xH_y(O(TiO_2)_n)_z$ wherein $x$ equals 1 to 2; $y$ equals 1 to 15; $n$ is 6–7 and $z$ equals $\frac{1}{2}(x+y)$.

3. A fibrous water-insoluble protonated sodium hexatitanate having the formula $Na_xH_y(O(TiO_2)_n)_z$ wherein $x$ equals 1 to 2; $y$ equals 1 to 15; $n$ is 6–7 and $z$ equals $\frac{1}{2}(x+y)$.

4. A fibrous water-insoluble protonated rubidium hexatitanate having the formula $Rb_xH_y(O(TiO_2)_n)_z$ wherein $x$ equals 1 to 2; $y$ equals 1 to 15; $n$ is 6–7 and $z$ equals $\frac{1}{2}(x+y)$.

5. A fibrous water-insoluble protonated cesium hexatitanate having the formula $Ce_xH_y(O(TiO_2)_n)_z$ wherein $x$ equals 1 to 2; $y$ equals 1 to 15; $n$ is 6–7 and $z$ equals $\frac{1}{2}(x+y)$.

6. A process for converting a fibrous alkali metal titanate of the formula $M_2O(TiO_2)_n$ wherein M is an alkali metal of atomic number of at least 11 and $n$ is 6–7, to protonated alkali metal titanate fibers which comprises subjecting said titanate to reaction with an aqueous solution of an acid in the pH range of 2 to 6.5 at temperatures ranging from about 25° C. up to the critical temperature of water, and calcining the resulting product at temperatures ranging from about 300° C. to 700° C.

7. A process for converting a fibrous alkali metal hexatitanate of the formula $M_2O(TiO_2)_n$ wherein M is an alkali metal of atomic number of at least 11, and $n$ is 6–7 to protonated alkali metal titanate fibers containing up to 96% $TiO_2$, which comprises reacting said hexatitanate with an aqueous solution of an acid having a pH ranging from 2 to 6.5 and at temperatures of 25° C. up to the critical temperature of water, and calcining the resulting product at temperatures ranging from about 400° C.–600° C.

References Cited in the file of this patent

UNITED STATES PATENTS

| | | |
|---|---|---|
| 1,731,364 | Bichowsky | Oct. 15, 1929 |
| 2,833,620 | Gier | May 6, 1958 |

FOREIGN PATENTS

| | | |
|---|---|---|
| 862,593 | Great Britain | Mar. 15, 1961 |

OTHER REFERENCES

Mellor: "Comprehensive Treatise on Inorganic and Theoretical Chemistry," Longmans, Green and Company, New York, vol. VII, pages 50–52.